United States Patent
Hagvall et al.

(10) Patent No.: US 12,386,034 B2
(45) Date of Patent: Aug. 12, 2025

(54) METHOD AND UNIT FOR EVALUATING A PERFORMANCE OF AN OBSTACLE DETECTION SYSTEM

(71) Applicant: Volvo Autonomous Solutions AB, Gothenburg (SE)

(72) Inventors: Linus Hagvall, Gothenburg (SE); Stefan Bergquist, Gothenburg (SE); Christian Grante, Västra Frölunda (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 272 days.

(21) Appl. No.: 18/064,014

(22) Filed: Dec. 9, 2022

(65) Prior Publication Data

US 2023/0184887 A1    Jun. 15, 2023

(30) Foreign Application Priority Data

Dec. 15, 2021 (EP) .................................... 21214792

(51) Int. Cl.
*G01S 7/40*     (2006.01)
*G01S 13/931*     (2020.01)

(52) U.S. Cl.
CPC ............ *G01S 7/40* (2013.01); *G01S 13/931* (2013.01)

(58) Field of Classification Search
CPC ......... G01S 7/40; G01S 13/931; G06V 20/58; G08G 1/166
See application file for complete search history.

(56) References Cited

U.S. PATENT DOCUMENTS

| | | | | |
|---|---|---|---|---|
| 11,922,703 B1* | 3/2024 | Saggu | ................. | G06V 20/58 |
| 12,031,829 B2* | 7/2024 | Wang | ................. | G01C 21/30 |
| 12,061,088 B2* | 8/2024 | Wang | ................. | G08G 1/165 |
| 2010/0026555 A1* | 2/2010 | Whittaker | ........... | G05D 1/0278 |
| | | | | 382/224 |
| 2019/0049992 A1 | 2/2019 | Riess et al. | | |
| 2020/0081119 A1* | 3/2020 | Zhou | ................. | G01S 7/497 |
| 2020/0089971 A1* | 3/2020 | Li | ................. | G01S 7/4972 |

(Continued)

FOREIGN PATENT DOCUMENTS

| CN | 111428651 | * | 7/2020 |
|---|---|---|---|
| JP | 2007178270 A | | 7/2007 |

OTHER PUBLICATIONS

Extended European Search Report in corresponding European Application No. 21214792.0 dated May 30, 2022 (6 pages).

(Continued)

*Primary Examiner* — Octavia Hollington
(74) *Attorney, Agent, or Firm* — Venable LLP; Jeffri A. Kaminski

(57) ABSTRACT

A method performed by a central unit for evaluating a performance of an obstacle detection system comprised in a first object within a set of two or more objects at a confined area. The first object is a vehicle. The central unit obtains pose data from each object in the set and obstacle detection data from at least the first object. The central unit determines a relative pose of the objects using the pose data from each object. The central unit the obstacle detection data from each object in the set to the determined relative pose of the objects. Based on the comparison, the central unit evaluates the performance of the obstacle detection system of the first object.

11 Claims, 5 Drawing Sheets

100

(56) References Cited

U.S. PATENT DOCUMENTS

2020/0380859 A1    12/2020  Lofter et al.
2024/0202964 A1*   6/2024   Gregson ................ G06V 20/58

OTHER PUBLICATIONS

Seong-Woo Kim et al.; "Multivehicle Cooperative Driving Using Cooperative Perception: Design and Experimental Validation"; IEEE Transactions on Intelligent Transportation Systems (vol. 16, Issue: 2, Apr. 2015); pp. 663-680; Date of Publication: Jul. 28, 2014; DOI: 10.1109/TITS.2014.2337316 (18 pages).

* cited by examiner

METHOD AND UNIT FOR EVALUATING A PERFORMANCE OF AN OBSTACLE DETECTION SYSTEM

TECHNICAL FIELD

The present disclosure relates generally to a central unit and a method performed by the central unit. More particularly, the present disclosure relates to evaluating a performance of an obstacle detection system comprised in a first object within a set of two or more objects at a confined area, the first object being a vehicle.

The invention can be applied in heavy-duty vehicles, such as trucks, buses and construction equipment etc. Although the invention will be described with respect to a truck, the invention is not restricted to this particular vehicle, but may also be used in other vehicles such as buses, trailers, wheel loaders, articulated haulers, excavators, backhoe loaders, passenger cars, marine vessels etc. It may also be applied in electrical systems of e.g. electrically operated vessels and in various industrial construction machines or working machines. It is applicable in fully electrically operated vehicles as well as in hybrid vehicles, comprising also a combustion engine.

The invention can be applied in a partly autonomous vehicle or a fully autonomous vehicle.

BACKGROUND

Vehicles comprises a number of sensors and systems for different purposes. Ensuring safety for vehicles typically puts requirement with high integrity and extremely low frequency of certain errors. This is important both for non-autonomous vehicles and in particular for vehicles that are at least partly autonomous. One challenging area when it comes to the safety aspect is perceiving data about the vehicle's surroundings. This is true for reaching high performance, but may be even more so when it comes to validating this level of performance.

Guaranteeing high integrity for perception is one of (if not the) most difficult problems preventing more difficult use cases from being automated or from obtaining an increased level of autonomy. Existing solutions often depend on perception systems or sensors which require large amounts of testing. Without finding a smart approach it is often considered infeasible to execute the required amounts of testing from both a practical and financial standpoint.

There are different statistical methodologies and different types of independence arguments which can affect the required amount of data, but the problem of collecting and processing the data still remains.

One common solution for proving the performance of a sensor is to compare the sensor data to ground truth data provided by a more advanced sensor which is commonly much more expensive than the intended production sensors. A ground truth sensor may be described as a sensor that provides data that is considered to be true, i.e. that is considered to be correct. However, then there is a problem that there does not exist ground truth sensors with sufficiently low fail rate to fulfil safety requirements for many use cases.

Therefore, there is a need to at least mitigate or solve this issue.

SUMMARY

An object of the invention is to provide an improved method for evaluating a performance of an obstacle detection system in a vehicle.

According to a first aspect, the object is achieved by a method according to claim 1. The method is performed by a central unit and is for evaluating a performance of an obstacle detection system comprised in a first object within a set of two or more objects at a confined area. The first object is a vehicle. The control unit obtains pose data from each object in the set and obstacle detection data from at least the first object. The control unit determines a relative pose of the objects using the pose data from each object. The control unit compares the obstacle detection data to the determined relative pose. Based on the comparison, the control unit evaluates the performance of the obstacle detection system of the first object. By the provision of the method, the advantage of evaluating the performance of the obstacle detection system is provided. The obstacle detection system is a safety critical system in a vehicle, and the safety is therefore improved with the provision of the method of the present invention when the performance of the obstacle detection system is evaluated. It is, for many use cases/situations, considerably easier to build a localization system with high integrity compared to an obstacle detection system.

With the present invention, validation and evaluation of the obstacle detection system is easier and less time consuming, as compared to known solutions. Furthermore, the present invention enables evaluation of the obstacle detection system to a degree necessary for many automatic driving (AD) use cases.

Unless a known obstacle detection system meets certain requirements or performance, AD vehicles cannot be deployed in many use cases. However, with the present invention a stopper for many types of AD deployments is provided, i.e. a type where the obstacle detection system is evaluated such that it should not be deployed.

According to one embodiment, at least a second object in the set may be a vehicle. Thus, both the first object and the second objects are vehicles, which may be considered dynamic objects, i.e. moving objects or potentially moving objects. For example, a vehicle standing still is a dynamic object since it is adapted to be moving. It may be an advantage to do the comparison with all type of objects that the obstacle detection system should be able to detect, for example to increase the quality and reliability of the evaluation of the performance. From a safety perspective, the obstacle detection system's ability to detect other moving objects, e.g. other vehicles, may have a high priority, as compared to detecting static objects. The quality and reliability of the evaluation may increase if the performance is evaluated based on different types of objects, e.g. both rocks and vehicles.

According to one embodiment, at least a second object in the set may be a static object. A static object may be a non-moving object, e.g. a rock, a house etc. An advantage of this may be that the quality and reliability of the evaluation of the performance may increase if objects of different types may be taken into account in the evaluation of the performance of the obstacle detection system.

According to another embodiment, the performance of the obstacle detection system may be evaluated for at least one operating condition of the first object during which the pose data and obstacle detection data are obtained. An advantage of using at least one operating condition may be that it is possible to determine in which operating conditions the obstacle detection system provides output data with sufficient quality and accuracy, and in which operating conditions the obstacle detection system provides output data with insufficient quality and accuracy. Output data with insufficient quality and accuracy may be disregarded. Separating between different operating conditions might make it possible to use the obstacle detection system under certain conditions and not others. If this was not possible, it might be impossible to prove that the obstacle detection system is safe enough for all operating conditions because it might actually not be. As an example, if the obstacle detection system comprises a camera, it might be sensitive to light conditions. If the camera only operates during daytime, an operating condition for daylight may be used and a result of the evaluation of the performance may indicate that the obstacle detection system has the required performance. If the operating conditions are not taken into account, data obtained during both day- and night-time may be used in the evaluation. Data obtained during night-time may be of low quality or it may be useless data. Thus, when operating conditions are taken into account, the quality and accuracy of the evaluation may increase and the possibility to meet the safety requirements for the obstacle detection system may also increase for the specific operating condition.

According to a further embodiment, the at least one operation condition may be at least one of weather condition, and light condition. This may be an advantage in that it can help both with validation and development aspects. For example it might be able to determine that the obstacle detection system reaches a high performance if the lux is above X and medium performance below X. Then it could be feasible to rely on the object detection system during certain conditions, e.g. certain parts of the day. Using at least one operating condition may make it possible to prove safety for part of a day, for certain weather conditions etc. It may also make it possible to prove safety for a certain set of operating conditions even though it may not be safe for all other operating conditions.

According to another embodiment, the performance of the obstacle detection system may be further evaluated for at least one object characteristic of the first object when the pose data and obstacle detection data are obtained. An advantage of using at least one object characteristics may be that it is possible to determine in which object characteristics the obstacle detection system provides output data with sufficient quality and accuracy, and in which object characteristics the obstacle detection system provides output data with insufficient quality and accuracy. Output data with insufficient quality and accuracy may be disregarded. For example, the performance may be evaluated to be poor or below a threshold when the evaluation is done for objects moving faster than X km/h. If it is possible to separate the data, it may be possible to evaluate that the performance is solid for objects below X km/h. Therefore, the quality and reliability of the evaluation is increased when at least one object characteristic is considered.

According to a further embodiment, the at least one object characteristic may be at least one of articulation angle, yaw rate, object speed and object acceleration. This may be an advantage in that it can help both with validation and development aspects. For example it might be able to determine that the obstacle detection system reaches a high performance if the object characteristics is below X and medium performance below Y. Then it could be feasible to rely on the object detection system during object characteristics, e.g. when the vehicle is driving with a speed that is below X.

According to a further embodiment, the central unit may obtain no-object data indicating a sub-area of the confined area where no objects are located. The obstacle detection data may be further compared to the non-object data and used in the evaluation of the performance to detect if there are any false-positive obstacle detection data. If the confined area is a fully confined are, it may be possible to know where there should be no detections by the objection detection system, e.g. everywhere where there are no other vehicles or static objects. Therefore, it is not only possible to check that correct detections are obtained when they should be obtained, but also to track the situations when the objection detection system detects objects that does not exist. In combination this means that it may be possible to create data relevant for validating all combinations of true/false-positive/negative readings by the objection detection system.

According to another embodiment, pose data and obstacle detection data obtained in a sub-area of the confined area that do not fulfill a predetermined criterion may be excluded from the evaluation. For certain sub-areas in the confined area it might be difficult to argue that the central unit, e.g. an offboard unit, could know the exact position and motion of all objects, in those cases all data which is gathered in such a zone may be excluded. This may for example be if there is an intersection with a public road which is included in the confined area. An advantage of this may be that it only data from objects that is of interest will be utilized in the method. This increases the quality of the method. Some confined areas may change continuously. In a mine for example, the surroundings in certain areas changes continuously as more material is mined and removed from the site.

According to a second aspect of the invention, the central unit is for evaluating a performance of an obstacle detection system comprised in a first object within a set of two or more objects at a confined area. The first object is a vehicle. The central unit is configured to perform the steps of the method described in the first aspect. The central unit may be an electronic central unit comprising processing circuitry for performing the method. The central unit may be a computer. The central unit may comprise hardware or hardware and software. Advantages and effects of the central unit are largely analogous to the advantages and effects of the method. Further, all embodiments of the method are applicable to and combinable with all embodiments of the central unit, and vice versa.

According to a third aspect of the present invention, the computer program may comprise program code means for performing the steps of the method according to any one of the embodiments described herein when said program is run on a computer. Advantages and effects of the computer program are largely analogous to the advantages and effects of the method. Further, all embodiments of the method are applicable to and combinable with all embodiments of the computer program, and vice versa.

According to a fourth aspect of the present invention, computer readable medium may carry a computer program comprising program code means for performing the steps of the method according to any one of the embodiments described herein when said program is run on a computer. Advantages and effects of the computer readable medium are largely analogous to the advantages and effects of the method. Further, all embodiments of the method are applicable to and combinable with all embodiments of the computer readable medium, and vice versa.

The present invention is not limited to the features and advantages mentioned above. A person skilled in the art will recognize additional features and advantages upon reading the following detailed description.

BRIEF DESCRIPTION OF THE DRAWINGS

With reference to the appended drawings, below follows a more detailed description of embodiments of the invention cited as examples.

In the drawings.

The drawings are not necessarily to scale, and the dimensions of certain features may have been exaggerated for the sake of clarity. Emphasis is instead placed upon illustrating the principle.

DETAILED DESCRIPTION OF EXAMPLE EMBODIMENTS OF THE INVENTION

Figure 1:
FIG. 1 is a schematic drawing illustrating a vehicle.
Figure 1:
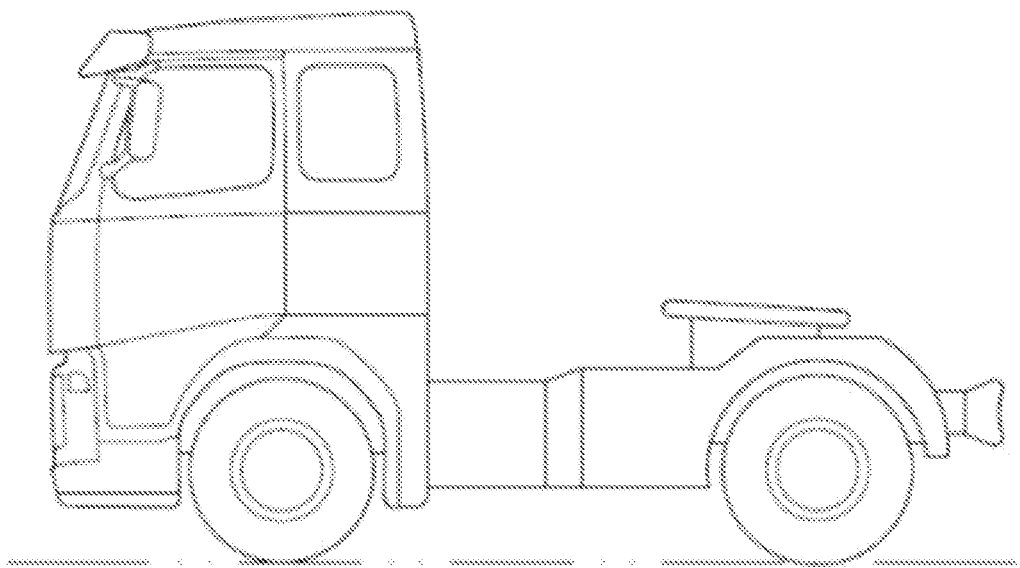

FIG. 1 illustrates a vehicle 100. The vehicle 100 may be a heavy-duty vehicle, such as truck, bus, construction equipment, trailer, wheel loader, excavator, passenger car, marine vessel, working machine etc. The vehicle 100 may be a fully electrically operated vehicle as well as a hybrid vehicle, comprising also a combustion engine, and a vehicle only comprising a combustion engine. The vehicle 100 may be a fully autonomous vehicle, an at least partly autonomous vehicle or a non-autonomous vehicle.

Directions as used herein, e.g. horizontal, vertical, lateral, relate to when the vehicle 100 is standing on flat ground. For convenience, the vehicle 100 as shown in FIG. 1 is defined herein with respect to a Cartesian coordinate system, wherein a longitudinal extension of the vehicle 100 extends along an x-axis, a transverse extension the vehicle 100 extends along a y-axis and a height extension of the vehicle 100 extends along a z-axis of the Cartesian coordinate system. It shall however be noted that directions, locations, orientations etc. may be expressed in any other type of coordinate system.

Figure 2:
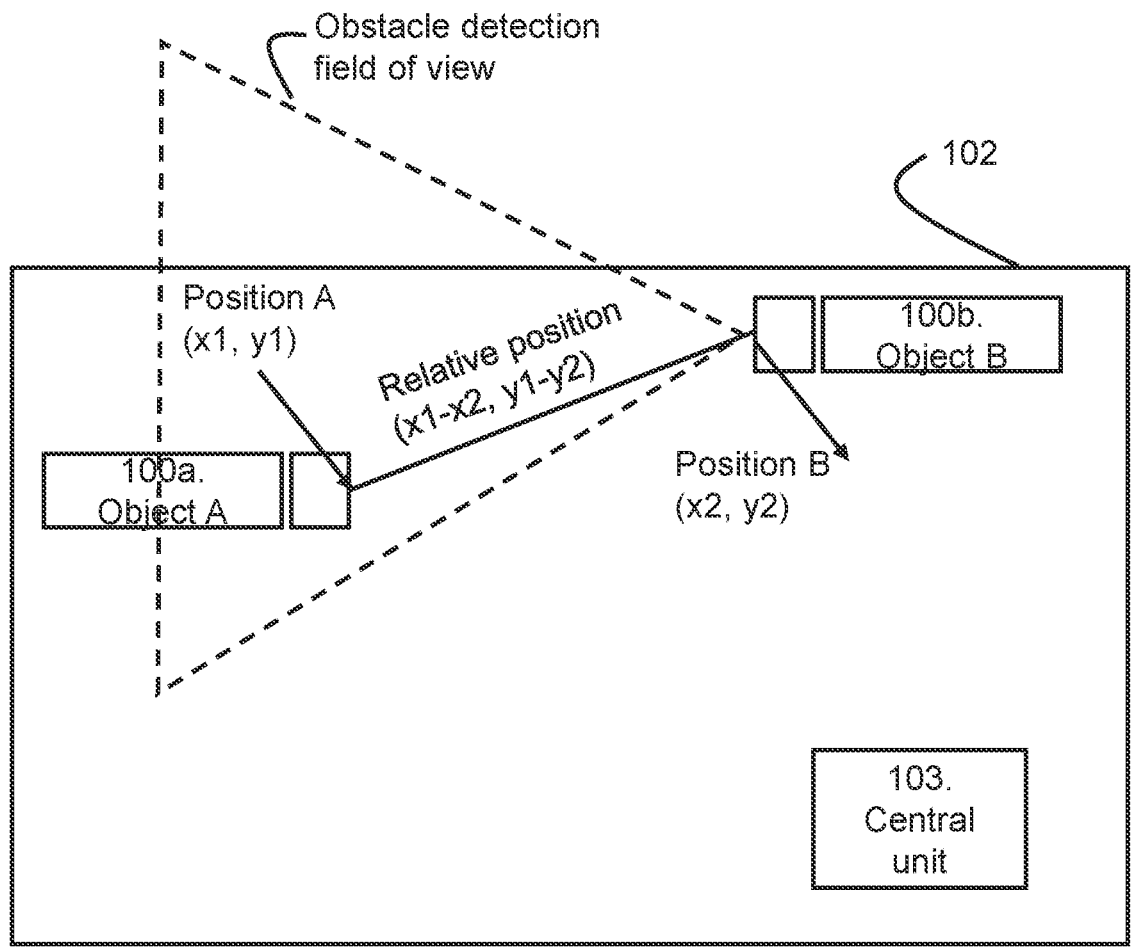
FIG. 2 is a schematic drawing illustrating a confined area.

FIG. 2 illustrates a confined area 102. The confined area 102 is a geographical area confined by any suitable means. Even though the confined area 102 in FIG. 2 is illustrated as a rectangle, it is to be understood that this is only an example and that the confined area 102 may be of any suitable size and shape. The confined area 102 may be a test site where at least one vehicle 100 is tested, or it may be any other area such as for example a collection of public roads in a city, a port area, etc.

A set of two or more objects 100a, 100b are comprised in the confined area 102, for example a first object 100a and a second object 100b. In the following, an example where the set of two or more objects 100a, 100b comprises two objects will be used. However, any number of objects 100 may be comprised in the confined area 102. When the reference number 100 is used herein, without the letters a or b, it refers to any object 100 at the confined area 102. In the example seen in FIG. 2, the first object 100a is referred to as Object A and the second object 100b is referred to as Object B.

As seen in FIG. 2, there is a central unit 103 comprised in the confined area 102. The central unit 103 is adapted to keep track of at least some of the objects 100 at the confined area 102. The central unit 103 is central with respect to the objects 100 and in that it has data for all objects 100 or at least some of the objects 100 at the confined area 102. The central unit 103 may be an electronic control unit comprising processing circuitry for performing the method described herein. The central unit 103 may be a computer. The central unit 103 may comprise hardware or hardware and software. The central unit 103 may comprise a processor, memory, transmitter, receiver etc. The central unit 103 may be located at any suitable position in the confined area 102. The central unit 103 may be an offboard server that is located offboard the vehicle 100.

The objects 100a, 100b comprised in the set of two or more objects 100a, 100b will now be described in more detail. One of the objects 100a, 100b in the set is a dynamic object, i.e. a moving object, and the other object may be a static object, i.e. non-moving object, or both objects 100a, 100b in the set may be moving objects. In the example shown in FIG. 2, both the first object 100a and the second object 100b are moving objects.

The first object 100a is a vehicle, for example the vehicle 100 illustrated in FIG. 1, and may therefore be referred to as an ego object, a first vehicle, vehicle A or ego vehicle. In the example in FIG. 2, the second object 100b is also a vehicle, and is therefore referred to as a second vehicle or vehicle B. Note that the second object 100b may instead be a static object, i.e. non-moving, but this example will not be described herein in detail.

The first object 100a, i.e. a vehicle, also referred to as a first vehicle or vehicle A, comprises an obstacle detection system. The obstacle detection system is adapted to detect obstacles in the surroundings of the first vehicle 100a, for example the second object 100b. Which type of obstacles the obstacle detection system is able to detect may be dependent on which sensor the obstacle detection system comprises. The obstacle detection system may be referred to as an object detection system or a perception system. The obstacles that the obstacle detection system is adapted to detect may be any type of obstacles such as for example other vehicles, persons, houses, traffic lights, etc; dependent on which sensor the obstacle detection system comprises. The obstacles that the obstacle detection system is adapted to detect may be static, i.e. non-moving, or they may be dynamic, i.e. moving. The obstacle detection system may comprise one or multiple sensors of different or the same type, for example camera, lidar, radar etc. The obstacle detection system may be located at any suitable location(s) inside and/or outside the first vehicle 100a. The obstacle detection system comprised in the first object 100a has an obstacle detection field of view, as illustrated with the dotted triangle in FIG. 2. Note that the triangle shape of the obstacle detection field of view is only an example and that the obstacle detection field of view may have any suitable shape and size. Within the obstacle detection field of view, the obstacle detection system is adapted to detect obstacles in the confined area 102. The obstacle detection system is adapted to provide output indicating obstacles in the obstacle detection field of view. The output may comprise a position of the detected object, a shape of the detected object, speed of the detected object, etc.

In the example in FIG. 2 where the second object 100b is also a vehicle, i.e. the second vehicle 100b, the second vehicle 100b comprises an obstacle detection system adapted to detect obstacles in the surroundings of the second vehicle 100b. The obstacle detection system comprised in the second vehicle 100b is similar to the one comprised in the first vehicle 100a and may provide output of similar type. Even the first object 100a is the only object in FIG. 2 that is illustrated with a field of view, the second object 100b may also have a field of view and consequently an obstacle detection system, but this is not illustrated in FIG. 2 for the sake of simplicity.

Each vehicle in the set of two or more objects, including the first vehicle 100a is adapted to determine its own pose, i.e. position and heading. The pose determined by each vehicle 100 may be of high integrity or to have an integrity that is above a threshold, i.e. it is assumed to be correct and to be ground truth data. A localization system comprised in each vehicle, through which the pose is obtained, may be assumed to be a ground truth system, i.e. that it has high integrity. Each vehicle 100 in the set is adapted to determine its own pose using any suitable determining means, e.g. a pose sensor etc. For the sake of simplicity, only the position of the first vehicle 100a and the second vehicle 100b is illustrated in FIG. 2 and the position is illustrated with the coordinates (x1, y1) and (x2, y2). The coordinates may be Cartesian coordinates or any other type of coordinates.

As mentioned earlier, the second object 100b may be a dynamic object, e.g. a moving object such as a vehicle, or it may be a static object, i.e. non-moving. The second object 100b, when it is a second vehicle, is adapted to determine its own pose. As for the first vehicle 100a, the pose determined by the second vehicle 100b may be of high integrity, i.e. it is assumed to be correct. The second vehicle 100b is adapted to determine its own pose using any suitable determining means, e.g. a pose sensor etc. For the sake of simplicity, only the position of the second vehicle 100b is illustrated in FIG. 2 and the position is illustrated with the coordinates (x2, y2). The coordinates may be Cartesian coordinates or any other type of coordinates.

In case the second object 100b is a static object, i.e. non-moving, it may also be adapted to determine its own pose by means of any suitable determining means comprised in the second object 100b. Consider an example where the second object 100b is a static object such as a traffic light. The traffic light being a static object may comprise for example a GPS unit or any other suitable pose determining unit that enables the traffic light to determine its own pose. In another example where the second object 100b is a house, the second object 100b may not necessarily be adapted to determine its own pose. However, the pose of the house may be known from map data or a database. The pose of the second object 100b, e.g. the house, may therefore be obtained by the central unit 103 from a map.

A relative position between the first object 100a and the second object 100b may be determined by subtracting the pose of the second object 100b from the pose of the first object 100a. Using the example with the positions (x1, y1) and (x2, y2) seen in FIG. 2, the relative position may be (x1-x2, y1-y2).

At a confined area 102 there are multiple objects 100a, 100b operating in the same geographical area. Given that these objects 100a, 100b may determine their own position or pose, i.e. position and heading, with high integrity it is possible to determine the relative pose of the objects 100a, 100b. This may for example be done through each objects 100a, 100b sending their pose data to the central unit 103 which then compares the absolute poses to each other.

The relative pose of two different objects 100a, 100b is useful information towards generating validation data for obstacle detection systems. For some cases, e.g. for an autonomous operating zone with autonomous vehicles, it is known that that there will not be any moving objects 100a, 100b confined area 102 except for the autonomous vehicles. In those cases, it means that it is possible to determine the position of all dynamic objects which an obstacle detection system should detect.

If an object 100 is equipped with an obstacle detections system and provides data of all detected obstacles to the central unit 103, it is possible to compare the detected obstacles towards the position of all other object 100 at the confined area 102. By aggregating these comparisons, it would then be possible to gather performance metrics for different aspects, for different field of views or different type of objects 100.

By using the output of a localization and ego motion system for two different objects 100a, 100b it would be possible to generate high quality ground truth data for the obstacle detection system automatically. In the next step, the ground truth data may be compared to the obstacle detection result from one or both objects 100 in order to for example generate performance metrics. Since this may easily, without any significant extra cost, be implemented in commercially operated sites it may be feasible to gather large amounts of labelled data for validation and/or development. This type of data may be used both for a combined obstacle detection system of multiple sensors as well as for individual sensors.

Figure 3:
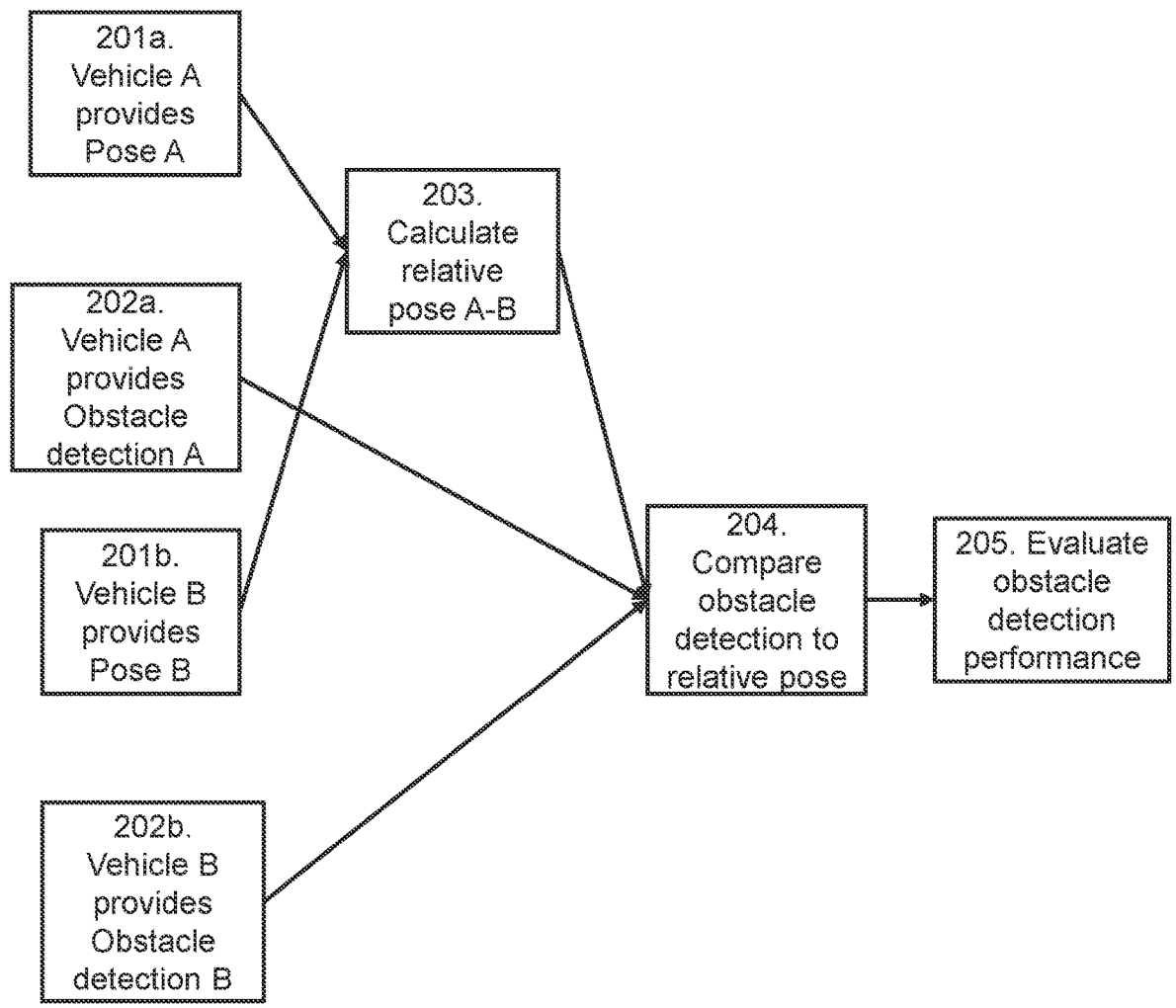
FIG. 3 is a flow chart illustrating a method.

FIG. 3 is a flow chart illustrating a method for evaluating a performance of an obstacle detection system comprised in a first object 100b within a set of two or more objects 100a, 100b at a confined area 102. FIG. 3 is based on an example where the first object 100a is a first vehicle and the second object 100b is a second vehicle. In other words, both objects in the set are dynamic objects, e.g. moving. The method exemplified in FIG. 3 comprises at least one of the following steps, which steps are performed in any suitable order than described below:

Step 201a

The first vehicle 100a provides pose data, e.g. pose A, to the central unit 103. The pose data comprises position data and heading data of the first vehicle 100a. The pose data is obtained by the first vehicle 100a itself, for example via a localization and ego motion system comprised in the first vehicle 100a. The pose data obtained by the first vehicle 100a may be assumed to already be validated, i.e. they are of high integrity.

Step 201b The second vehicle 100b provides pose data, e.g. pose B, to the central unit 103. The pose data comprises position data and heading data of the second vehicle 100b. The pose data is obtained by the second vehicle 100b itself, for example via a localization and ego motion system comprised in the second vehicle 100b. The pose data obtained by the second vehicle 100b may be assumed to already be validated, i.e. they are of high integrity.

After steps 201a and 201b have been performed, the central unit 103 comprises pose data for all objects 100 in the confined area 102.

Step 202a

The first vehicle 100a provides obstacle detection data, e.g. obstacle detection A, to the central unit 103. The obstacle detection data may comprise the position of the obstacle detected by the first vehicle 100a. The first vehicle 100a obtains the obstacle detection data from its obstacle detection system. The obstacle detection system is assumed to not be validated, which is contrast to the pose data which is assumed to already be validated. Consequently, the obstacle detection data are not validated. The obstacle detection data may, in addition to the position, comprise other data such as for example speed and acceleration in different directions, etc.

Step 202b

The second vehicle 100b may provide obstacle detection data, e.g. obstacle detection B, to the central unit 103. The obstacle detection data may comprise the position of the obstacle detected by the second vehicle 100b. The second vehicle 100b obtains the obstacle detection data from its obstacle detection system. The obstacle detection system is assumed to not be validated, which is in contrast to the poste data which is assumed to already be validated. Consequently, the obstacle detection data are not validated. The obstacle detection data may, in addition to the position, comprise other data such as for example speed and acceleration in different directions, etc.

Step 202b may be performed if the second object 100b is a vehicle, e.g. the second vehicle 100b, and if the second object 100b comprises a obstacle detection system. For example, if the second object 100b is a static object, e.g. a rock or a house, then the second object 100b does not necessarily comprise any obstacle detection system and consequently does not provide any obstacle detection data.

Steps 201a, 201b, 202a and 202b may be performed in any suitable order.

After steps 202a and 202b have been performed, the central unit 103 comprises obstacle detection data from at least one object 100 in the confined area 102, i.e. data indicating the obstacles that at least one of the objects 100 has detected in the confined area 102, i.e. the object 100 that comprises an obstacle detection system.

Step 203

The central unit 103 calculates the relative pose of the first vehicle 100a and the second vehicle 100b. The calculation is done based on the pose data from step 201a and step 201b. The relative pose may be determined by subtracting the pose of the second vehicle 100b from the pose of the first vehicle 100a, e.g. pose A-pose B. The relative pose indicates the positional relationship between the first vehicle 100a and the second vehicle 100b. The relative pose may be referred to as ground truth data.

By using output of a localization and ego motion system for two different vehicles 100a, 100b it would be possible to calculate high quality ground truth data for the obstacle detection system of the first object 100a automatically.

Step 203 is performed at any time after steps 201a and 201b have been performed. Step 203 may be performed directly after steps 201a and 201b have been performed and before steps 202a and 202b are performed. Step 203 may be performed after steps 201 and 201b have been performed, and also after one of steps 202a or 202b are performed, or after both steps 202a and 202b have been performed. Note that steps 201 and 202 are performed in real-time. Steps 203-205 may be done at any future point in time.

Step 204

The central unit 103 compares the obstacle detection data from steps 202a and step 202b to the relative pose from step 203. The result of the comparison indicates that the obstacle detection data and the relative pose are the same, with some tolerance, or that they are different. Comparing the obstacle detection data to the relative pose may be referred to as validating the obstacle detection data.

The relative pose from step 203, i.e. the ground truth data, is compared to the obstacle detection data from both vehicles 100a, 100b in order to for example generate a performance metrics. Each comparison provides one measurement point of the performance metric. For example, if the performance metrics is difference between measured distance to the object. The first comparison from the first object 100a provides one sample (x m). The second comparison from the second object 100b provides another sample (y m).

Step 205

The central unit 103 evaluates the performance of the obstacle detection system of the first vehicle 100a based on the result of the comparison in step 204.

The evaluation is performed over time.

If the result of the comparison in step 204 indicates that the obstacle detection data and the relative pose are the same or that they are substantially the same with some tolerance, then the performance of the obstacle detection system may be evaluated to have a certain performance e.g. a certain performance value. For example, if the performance value has reached or is above a predetermined performance threshold, then the performance may be considered to be sufficient or of high quality.

If the result of the comparison in step 204 indicates that the obstacle detection data and the relative pose are the different or different above a tolerance, then the performance of the obstacle detection system may be evaluated to have certain performance value. For example, if the performance value has not reached a predetermined performance threshold, then the performance may be considered to be not sufficient or to be of low quality.

The central unit 103 may comprise other type of data, in addition to the data obtain in steps 201a, 201b, 202a and 202b, for example data about the operating condition of at least one of the objects 100. This may for example include current or a distribution of different weather types and light conditions. This may be useful data since it may help in the evaluation of the performance of the obstacle detection system, in particular in validation and development aspects. For example, the central unit 103 may, as part of the evaluation of the performance of the obstacle detection system, be able to determine that the obstacle detection system reaches a high performance if the lux is above X and medium performance below X. Then it may be feasible to rely on the obstacle detection system during certain conditions, e.g. certain parts of the day. The data of the operating condition of at least one vehicle 100 may be obtained from of the particular vehicle 100 which may comprise sensors adapted to detect the operating condition, e.g. a. light sensor, a weather sensor etc. Or, the data of the operating condition may be obtained by the central unit 103 from another unit, e.g. a weather sensor comprised in the confined area 103 or a weather server located at some other place, a light sensor comprised at the confined area 13 etc.

The result of step 205 may be used in different ways. One example is to automatically provide labelled raw data which is useful for many purposes, including development, verification and validation of the obstacle detection system. It may also be possible to estimate or provide a performance metrics which is easy to store and is useful for verification and validation purposes. Of course, there are many potential steps between as this may almost be seen as a continuous scale rather than a discrete.

In addition to the pose data and the obstacle detection data from steps 201a, 201b, 202a and 202b, the central unit 103 may obtain additional data associated with at least one of the objects 100, for example object characteristics that at least one of the objects have when they obtained the pose data and the obstacle detection data. The object characteristics may be for example at least one of:

articulation angle,
yaw rate,
object speed,
object acceleration, and
object position relative to a road, e.g. in which lane an object 100 is located.

At least one of these object characteristics and for at least one of the vehicles 100 may be used by the central unit 103 when evaluating the performance of the obstacle detection system of the first vehicle 100a. Some of the object characteristics may be referred to as motion characteristics of the object 100. The object characteristics may be obtained by the central unit 103 from the object 100, it may be determined by the central unit 103 based on the pose data and/or the obstacle detection data, it may be obtained from another unit located at the confined area 102 or at some other location, e.g. a central unit a cloud unit etc.

Summarized, the central unit 103 may obtain and evaluate the performance for at least one of the following data:
- pose data, i.e. position and heading
- obstacle detection data
- weather condition,
- light condition
- articulation angle
- yaw rate
- object speed
- object acceleration
- object position relative to a road, e.g. in which lane an object 100 is located.

The operating conditions and the object characteristics relate to the ego vehicle, i.e. the first object 100a. For example, it may be the case that the performance of the obstacle detection system is different when the ego vehicle is turning and when it is driving straight.

The performance of the obstacle detection system may be evaluated for the pose data individually. For example, the detected relative object position from the obstacle detection system and speed may be evaluated individually. The result of the evaluation may indicate that the position may be trusted with enough integrity but not the speed.

Steps 201-205 may be repeated if the performance of the obstacle detection system of the second vehicle 100b is to be evaluated.

The performance of the obstacle detection system may be evaluated towards the Operational Design Domain (ODD) of the confined area 102 where the data is collected.

For example it might be evaluated against detecting trucks, but not cars. This may however still be very useful since it potentially may be used to allow mixed traffic with manually driven trucks. One may also imagine a scenario where manual vehicles, e.g. cars are equipped with a validated localization system which the central unit 103 may use to start generating obstacle detection data for as well.

The object detection system comprised in the first object 100a may detect obstacles which are dynamic objects. However, this does not have to be a limitation. It may be even easier for the object detection system to detect obstacles which are static objects. Since a static object is always in the same location it would not need to send it position continuously. The static position may then be compared to the dynamic position of the first object 100a, e.g. the first vehicle, and the computed relative position compared to the object detection data. The object detection does not have to be limited to static or moving objects. For example, the state of a traffic light or the position of a road barrier are also examples which would be relatively easy to be detected by the obstacle detection system.

For a fully confined area 102, the central unit 103 may know where there should be no detections, i.e. everywhere where there are no other vehicles or static objects. Therefore, it is not possible to only check that correct detections are detected when they should be detected, but also track the situations when the obstacle detection system detects objects that does not exist. In combination, this means that it is possible to create data relevant for validating all combinations of true/false-positive/negative system readings.

For certain zones or sub-areas in certain confined areas 102, the central unit 103 may not have access to the exact position and motion of all objects at the confined area 102. In those cases all data which is gathered in such a zone may be excluded from the evaluation. This may for example be if there is an intersection with a public road which is included in the confined area 102.

Steps 203, 204 and 205 may be performed in real-time or at some later time after the data has been obtained, e.g. in batches.

Figure 4:
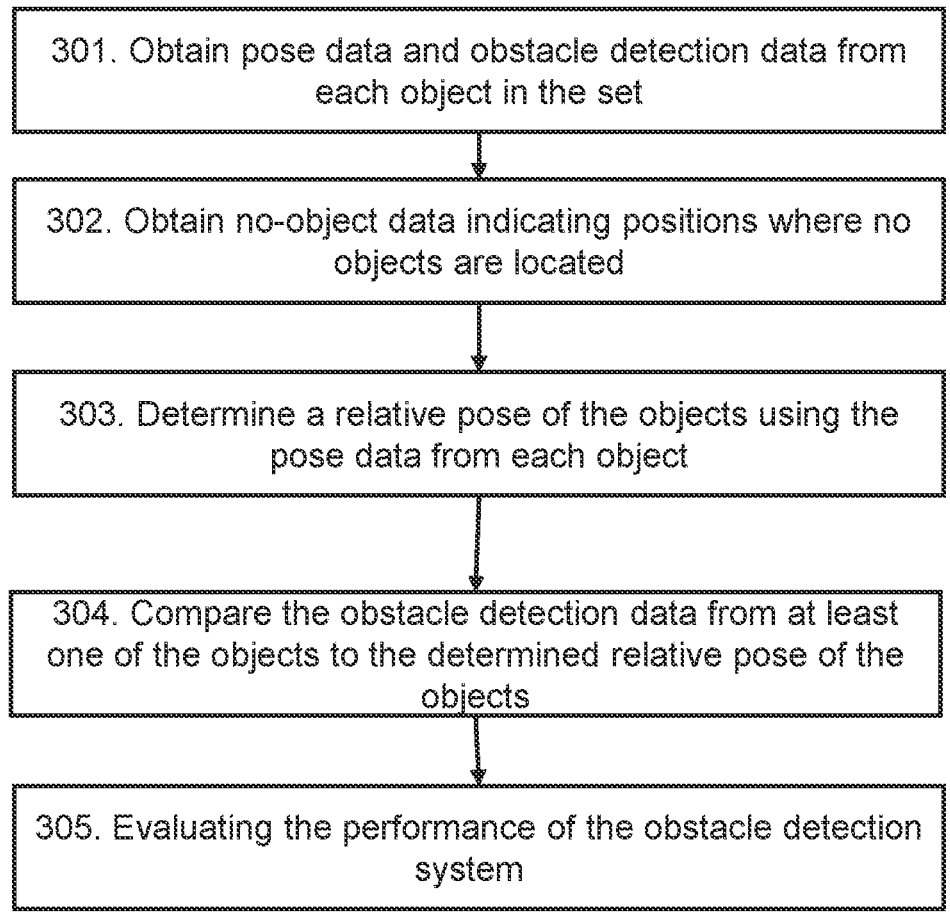
FIG. 4 is a flow chart illustrating a method.

The method described above will now be described seen from the perspective of the central unit 103. FIG. 4 is a flowchart describing the method in the central unit 103, for evaluating a performance of an obstacle detection system comprised in a first object 100a within a set of two or more objects 100a, 100b at a confined area 102. The first object 100a is a vehicle. At least a second object 100b in the set may be a vehicle. At least a second object 100b in the set may be a static object. The method comprises at least one of the following steps to be performed by the central unit 103, which steps may be performed in any suitable order than described below:

Step 301

This step corresponds to steps 201a, 201b, 202a, 202b in FIG. 3. The central unit 103 obtains pose data from each object 100a, 100b in the set and obstacle detection data from at least the first object 100a, i.e. the vehicle 100a.

Step 302

The central unit 103 may obtain no-object data indicating a sub-area of the confined area 102 where no objects are located.

Step 303

This step corresponds to step 203 in FIG. 3. The central unit 103 determines a relative pose of the objects 100a, 100b using the pose data from each object 100a, 100b.

Step 304

This step corresponds to step 204 in FIG. 3. The central unit 103 compares the obstacle detection data from at least the first object 100a to the determined relative pose of the objects 100a, 100b.

The obstacle detection data may be further compared to the non-object data from step 302.

If two or more objects 100 comprises obstacle detection systems, then obstacle detection data from each of these objects 100 may be used in the comparison in step 304.

Step 305

This step corresponds to step 205 in FIG. 3. Based on the comparison, the central unit 103 evaluates the performance of the obstacle detection system of the first object 100a.

The evaluation is performed over time.

The performance of the obstacle detection system may be evaluated for at least one operating condition of the first object 100a during which the pose data and obstacle detection data are obtained. The at least one operation condition may be at least one of:
- weather condition, and
- light condition.

The performance of the obstacle detection system may be evaluated for at least one object characteristic of the first object 100a when the pose data and obstacle detection data are obtained. The at least one object characteristic may be at least one of:
- articulation angle,
- yaw rate,
- object speed,
- object acceleration, and
- object position relative to a road, e.g. in which lane the object 100 is located.

The obstacle detection data that may be compared to the non-object data in step 304 may be used in the evaluation of the performance to detect if there are any false-positive obstacle detection data.

The pose data and obstacle detection data may be obtained in a sub-area of the confined area 102 that do not fulfill a criterion are excluded from the evaluation. The criterion may be a predetermined criterion. The criterion may be that the central unit 103 is adapted to obtain pose data and possibly also motion data from all objects in the sub-area, for example if there is an intersection with a public road which is included in the confined area 102. In other words, a sub-area of the confined area 102 where the central unit 103 is not adapted to or able to obtain pose data and possibly also motion data from all objects may be excluded from the evaluation.

Steps 303, 304 and 305 may be performed in real-time or at some later time after the data has been obtained, e.g. in batches.

The central unit 103 for evaluating a performance of an obstacle detection system comprised in a first object 100a within a set of two or more objects 100a, 100b at a confined area 102 is configured to perform the at least one of the steps of the method described herein. The first object 100a is a vehicle. At least a second object 100b in the set may be a vehicle. At least a second object 100b in the set may be a static object. To perform at least one of the method steps shown in FIGS. 3 and 4, the central unit 103 may comprise an arrangement as shown in FIG. 5.

Figure 5:
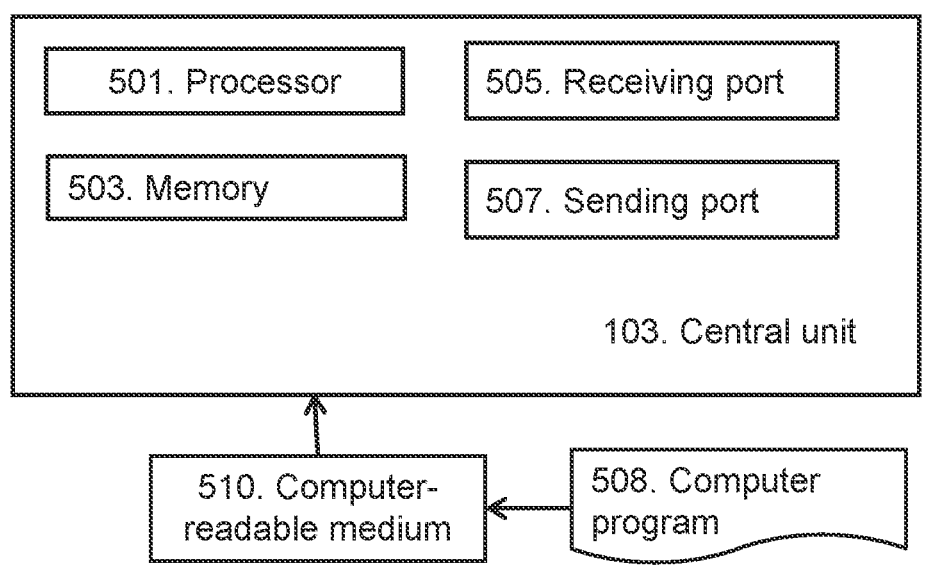
FIG. 5 is a schematic drawing illustrating a central unit.

The present disclosure related to the central unit 103 may be implemented through one or more processors, such as a processor 501 in the central unit 103 depicted in FIG. 5, together with computer program code for performing the functions and actions described herein. A processor, as used herein, may be understood to be a hardware component. The program code mentioned above may also be provided as a computer program product, for instance in the form of a data carrier carrying computer program code for performing the present disclosure when being loaded into the central unit 103. One such carrier may be in the form of a CD ROM disc. It is however feasible with other data carriers such as a memory stick. The computer program code may be provided as pure program code on a server and downloaded to the central unit 103.

The central unit 103 may comprise a memory 503 comprising one or more memory units. The memory 503 is arranged to be used to store obtained data, store data, configurations, schedulings, and applications etc. to perform the methods herein when being executed in the central unit 103.

The central unit 103 may receive data and information from, e.g. the objects 100a, 100b, through a receiving port 505. The receiving port 505 may be, for example, connected to one or more antennas in central unit 103. The central unit 103 may receive data from another structure in the confined area 102 or in another location through the receiving port 505. Since the receiving port 505 may be in communication with the processor 501, the receiving port 505 may then send the received data to the processor 501. The receiving port 505 may also be configured to receive other data.

The processor 501 in the central unit 103 may be configured to transmit or send data to e.g. the objects 100a, 100b or another structure in the confined area 102 or in another location, through a sending port 507, which may be in communication with the processor 501, and the memory 503.

The central unit 103 is configured to, e.g. by means of the processor 501 or the receiving port 505, obtain pose data from each object 100a, 100b in the set and to obtain obstacle detection data from at least the first object 100a.

The central unit 103 is configured to, e.g. by means of the processor 501, determine a relative pose of the objects 100a, 100b using the pose data from each object 100a, 100b.

The central unit 103 is configured to, e.g. by means of the processor 501, compare the obstacle detection data to the determined relative pose. If two or more objects 100 comprises obstacle detection systems, then obstacle detection data from each of these objects 100 may be used in the comparison.

The central unit 103 is configured to, e.g. by means of the processor 501, based on the comparison, evaluate the performance of the obstacle detection system of the first object 100a. The performance of the obstacle detection system may be evaluated for at least one operating condition of the first object 100a during which the pose data and obstacle detection data are obtained. The at least one operation condition may be at least one of:
weather condition, and
light condition.

The performance of the obstacle detection system may be evaluated for at least one object characteristic of the first object 100a when the pose data and obstacle detection data are obtained. The at least one object characteristic may be at least one of:
articulation angle,
yaw rate,
object speed,
object acceleration,
object position relative to a road, e.g. in which lane the object 100 is located.

The central unit 103 may be adapted to, e.g. by means of the processor 501 or the receiving port 505, obtain no-object data indicating a sub-area of the confined area 102 where no objects are located. The obstacle detection data may be further compared to the non-object data and used in the evaluation of the performance to detect if there are any false-positive obstacle detection data.

The pose data and obstacle detection data obtained in a sub-area of the confined area 102 that do not fulfill a criterion may be excluded from the evaluation.

Thus, the methods described herein for the central unit 103 may be respectively implemented by means of a computer program 508, comprising instructions, i.e., software code portions, which, when executed on at least one processor 501, cause the at least one processor 501 to carry out the actions described herein, as performed by the central unit 103. The computer program 508 product may be stored on a computer-readable medium 510. The computer-readable medium 510, having stored thereon the computer program 508, may comprise instructions which, when executed on at least one processor 501, cause the at least one processor 501 to carry out the actions described herein, as performed by the central unit 103. The computer-readable medium 510 may be a non-transitory computer-readable storage medium, such as a CD ROM disc, or a memory stick. The computer program 508 product may be stored on a carrier containing the computer program 508 just described, wherein the carrier is one of an electronic signal, optical signal, radio signal, or the computer-readable medium 510, as described above.

A computer program, e.g. the computer program 508 in FIG. 5, may comprise program code means for performing the steps of the methods described herein when said program is run on a computer.

A computer readable medium may carry a computer program, e.g. the computer program 508 in FIG. 5, comprising program code means for performing the steps of the methods described herein when said program is run on a computer.

Summarized, the present invention relates to a method to allow for validation of safety critical perception system(s) in a vehicle 100.

The present invention provides a method that makes it feasible to validate an obstacle detection system, e.g. critical aspects of the obstacle detection system. This is done by generating data with high quality and a method that is scalable to large quantities.

The present invention relates to evaluating the performance of an obstacle detection system by collecting large quantities of high-quality obstacle detection data. Obstacle detection data may be of high-quality when the data fulfils accuracy requirements a sufficiently large part of the time. Typically 99.99 . . . % of the time, where the number of nines depends on requirement level. The obstacle detection system should be able to be implemented in a vehicle that is being operated in production and generating value for simple autonomous use cases with minimal extra cost. While it is not uncommon to use data from commercial operation in development, the present invention may ensure validated high-quality data for unvalidated obstacle detection system without introducing expensive and often non-existing ground truth sensors or manual labelling.

The present invention aims to utilize certain capabilities which are already validated in an object 100 or a number of objects 100. The present invention assumes that there are high integrity localization systems, e.g. comprising one or more sensors, determining a pose of the object, which may be built given certain circumstances.

The present invention may be applied to a confined area 102 where there are multiple objects with a localization system implemented. The performance of the unvalidated obstacle detection system may then be evaluated using the validated localization systems of multiple objects. I.e. A combination of pose of the first vehicle A 100*a* and the pose of the second vehicle B 100*b* may be used as ground truth for the obstacle detection system in the second vehicle B 100*b*, and vice versa.

With the present invention, data is provided to and obtained by a central unit 103 that also has information about the movement of all objects 100 in the confined area 102. Based on this data, it is possible to evaluate the performance of the obstacle detection system of a particular object over time so that, after some time, may say that this obstacle detection system is safe and possibly also for a particular use case.

The present invention it is possible to evaluate performance, e.g. accuracy and/or reliability, for an obstacle detection system across several objects over time. The present invention is useful for finding strong statistical arguments for that a certain obstacle detection system has a certain performance overall, i.e. what often is needed to create safety cases for perception systems.

By using data from production of the obstacle detection system, enough data may be obtained to prove high integrity on the obstacle detection system to a reasonable cost.

When this has been shown, not all vehicles need to have the localization system and the cost could be reduced. It is desirable to detect obstacles around the first vehicle 100*a* to avoid colliding with them. One way to do this is to equip the first vehicle 100*a* with an obstacle detection system. However, proving that the obstacle detection system is safe, e.g. that the performance of the obstacle detection system is sufficient, requires a lot of mileage and is too expensive. A localization system may reach high integrity to a more reasonable cost and is needed on the first vehicle 100, for example when the first vehicle 100*a* is an at least partly autonomous vehicle. By placing a localization system on all other objects at the confined area 102 they may be detected, and collisions may be avoided or at least reduced. However, this requires all objects 100*a*, 100*b* that enters or is located at the confined are 102 to have the localization system which is costly and limiting. Localization systems are therefore placed on all objects being vehicles on initial confined areas 102 together with the obstacle detection system. Localization data is used to prove the integrity of the obstacle detection system. When the obstacle detection system is proven safe, only the obstacle detection system is needed for all future confined areas 102. Therefore, the cost is reduced, and the system is less limiting. Depending on the use case it might be sufficient with only object detection, only localization, both. In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It is to be understood that the present invention is not limited to the embodiments described above and illustrated in the drawings; rather, the skilled person will recognize that many changes and modifications may be made within the scope of the appended claims.

The invention claimed is:

1. A method performed by a central unit for evaluating a performance of an obstacle detection system comprised in a first object within a set of two or more objects at a confined area, the first object being a vehicle, the method comprising:
   obtaining pose data from each object in the set and obstacle detection data from at least the first object, wherein the obstacle detection data comprises a position of an obstacle detected by at least the first vehicle;
   determining a relative pose of the objects using the pose data from each object;
   comparing the obstacle detection data to the determined relative pose; and
   based on the comparison, evaluating the performance of the obstacle detection system of the first object.

2. The method according to claim 1, wherein at least a second object in the set is a vehicle.

3. The method according to claim 1, wherein at least a second object in the set is a static object.

4. The method according to claim 1, wherein the performance of the obstacle detection system is evaluated for at least one operating condition of the first object during which the pose data and obstacle detection data are obtained, and wherein the performance of the obstacle detection system is evaluated for at least one operating condition to determine in which operating conditions the obstacle detection system provides output data with sufficient quality and accuracy and in which operating conditions the obstacle system provides output data with insufficient quality and accuracy.

5. The method according to claim 4, wherein the at least one operating condition is at least one of:

weather condition, and light condition.

6. The method according to claim 1, wherein the performance of the obstacle detection system is evaluated for at least one object characteristic of the first object when the pose data and obstacle detection data are obtained, and wherein the performance of the obstacle detection system is evaluated for at least one object characteristic to determine in which object characteristics the obstacle detection system provides output data with sufficient quality and accuracy and in which object characteristics the obstacle detection system provides output data with insufficient quality and accuracy.

7. The method according to claim 6, wherein the at least one object characteristic is at least one of:

articulation angle, yaw rate, object speed, object acceleration, and object position relative to a road.

8. The method according to claim 1, comprising:

obtaining no-object data indicating a sub-area of the confined area where no objects are located; and wherein the obstacle detection data are further compared to the non-object data and used in the evaluation of the performance to detect if there are any false-positive obstacle detection data.

9. The method according to claim 1, wherein pose data and obstacle detection data obtained in a sub-area of the confined area that do not fulfill a criterion are excluded from the evaluation.

10. A central unit for evaluating a performance of an obstacle detection system comprised in a first object within a set of two or more objects at a confined area, the first object being a vehicle, the central unit being configured to perform the steps of the method according to claim 1.

11. A non-transitory computer readable medium carrying a computer program comprising program code for performing the method of claim 1 when said program code is run on a computer.

* * * * *